United States Patent [19]

Van et al.

[11] Patent Number: 5,043,971
[45] Date of Patent: Aug. 27, 1991

[54] METHOD AND APPARATUS FOR PRE-COMPENSATION IN AN OPTICAL DISC

[75] Inventors: Hai-Hoa Van, San Jose; Joel D. Finegan, Campbell; Der-Chang Hsieh, Cupertion, all of Calif.

[73] Assignee: Tandy Corporation, Ft. Worth, Tex.

[21] Appl. No.: 414,046

[22] Filed: Sep. 28, 1989

[51] Int. Cl.$^5$ .............................................. G11B 7/00
[52] U.S. Cl. .................................. 369/124; 369/116; 346/76 L
[58] Field of Search .................... 369/53, 54, 58, 116, 369/124, 59, 100; 346/76 L, 135.1

[56] References Cited

U.S. PATENT DOCUMENTS

| | | | |
|---|---|---|---|
| 3,988,531 | 10/1976 | Laub | 358/337 |
| 3,988,532 | 10/1976 | Korpel | 358/340 |
| 4,222,072 | 9/1980 | Bailey et al. | 358/342 |
| 4,398,203 | 8/1983 | Cornet | 346/135.1 |
| 4,425,637 | 1/1984 | Tanaka et al. | 369/124 |
| 4,488,277 | 12/1984 | McFarlane et al. | 369/116 X |
| 4,499,572 | 2/1985 | Yoshikawa et al. | 369/111 |
| 4,616,356 | 10/1986 | Wilkinson et al. | 369/116 |
| 4,719,615 | 1/1988 | Feyrer et al. | 369/284 |
| 4,788,674 | 11/1988 | Maeda et al. | 369/54 |
| 4,873,680 | 10/1989 | Chung et al. | 369/59 |
| 4,896,314 | 1/1990 | Skiens et al. | 369/284 |

OTHER PUBLICATIONS

Watkinson, *The Art of Digital Audio*, Focal Press, 1988, Chap. 6, pp. 163-200.
Watkinson, *The Art of Digital Audio*, Focal Press, 1988, Chap. 8, pp. 248-296.

*Primary Examiner*—Robert L. Richardson
*Attorney, Agent, or Firm*—Townsend and Townsend

[57] ABSTRACT

A method and associated apparatus for providing improved data mark formation on an optical disc is disclosed. The amplitude of a laser write beam in an optical recording system is varied during application of the mark. Additionally, the illumination period of the laser is adjusted to account for differences between the actual length of a formed data mark and the desired length of a data mark.

20 Claims, 10 Drawing Sheets

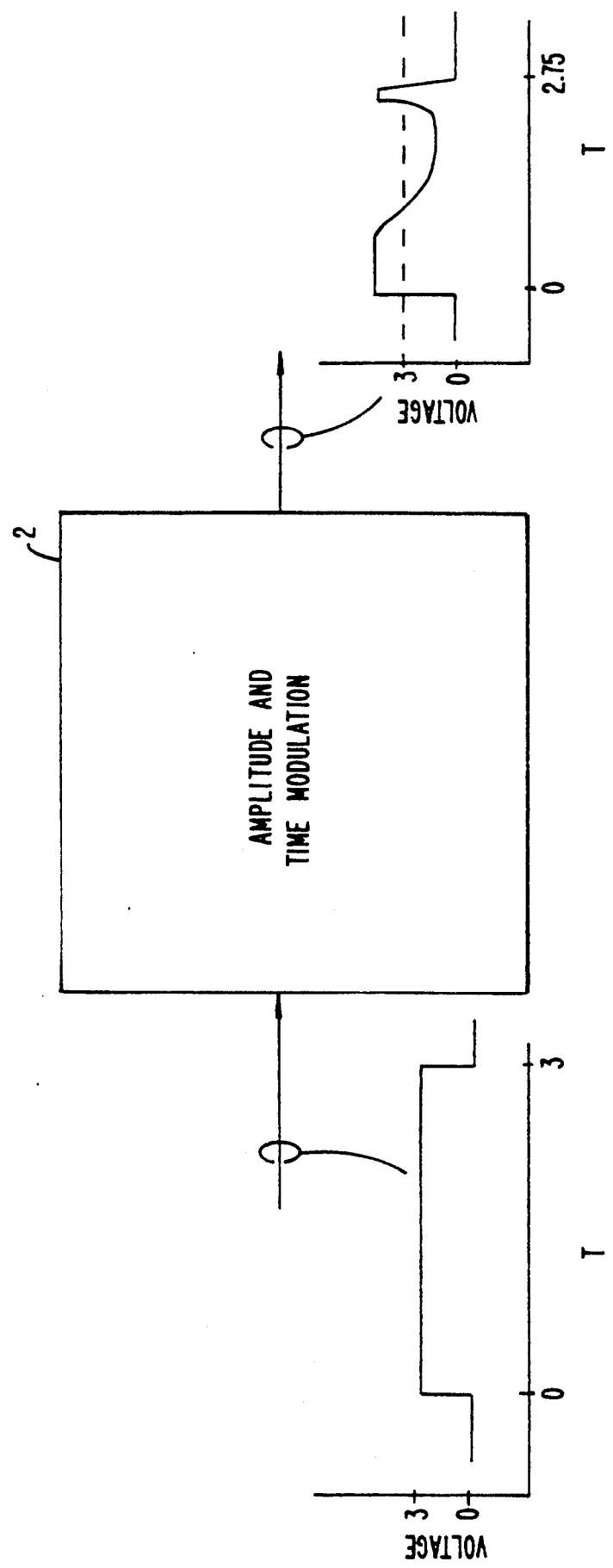
FIG._1.

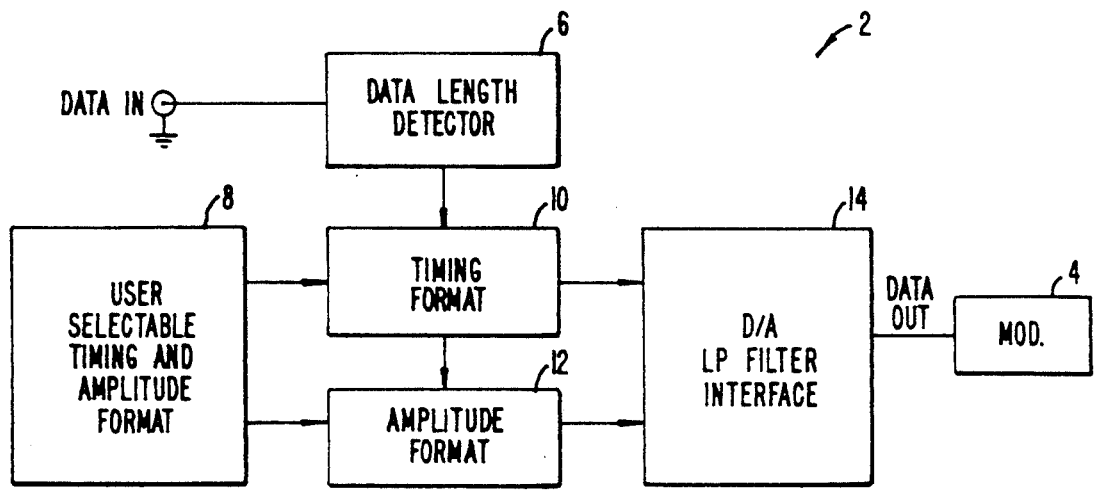
FIG._2.
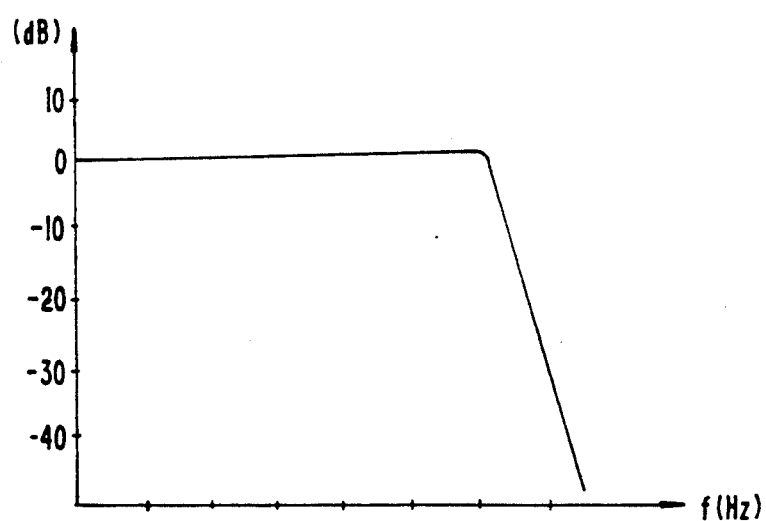
FREQUENCY RESPONSE OF THE LPF
FIG._4.

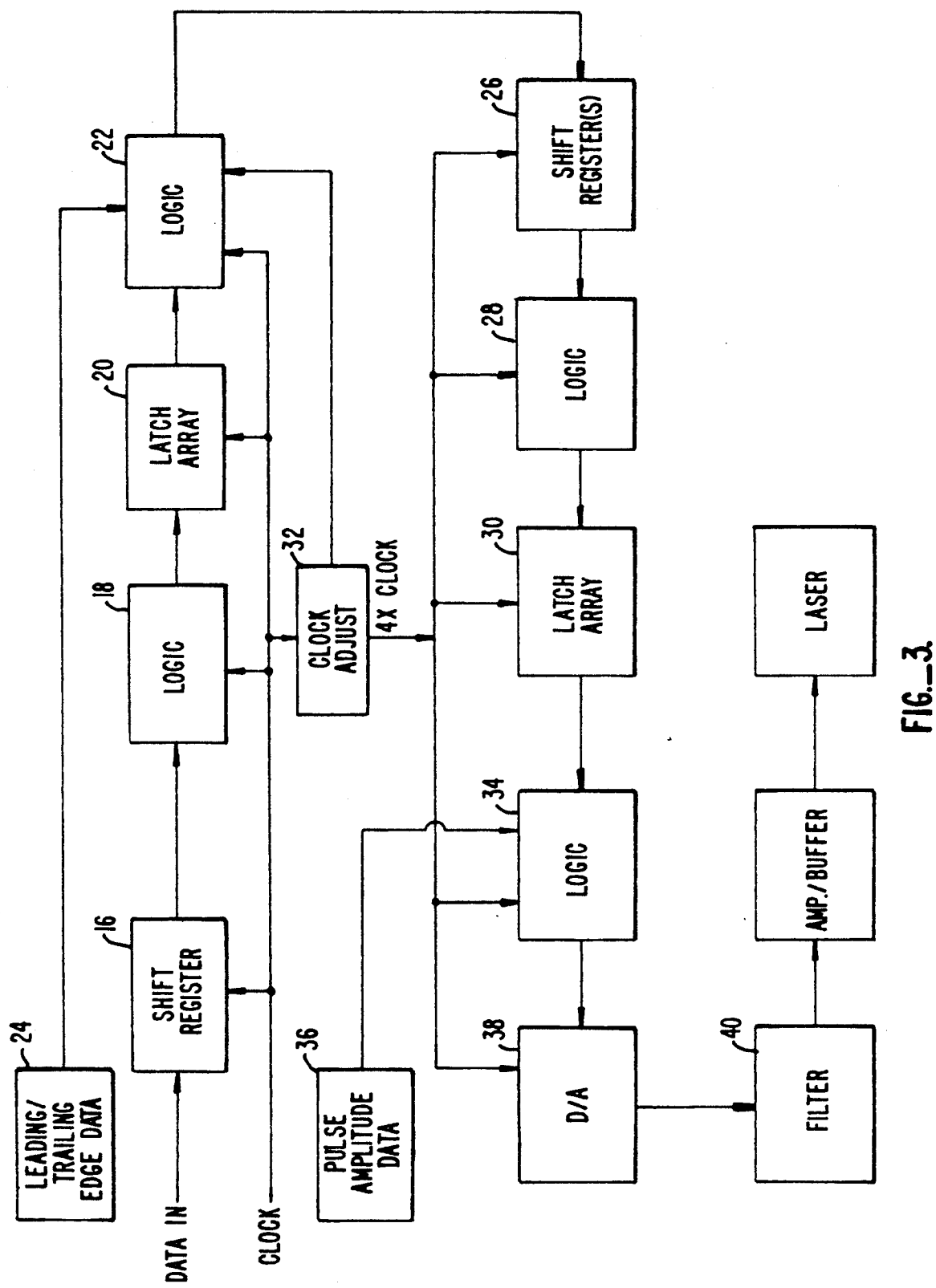
FIG._3.

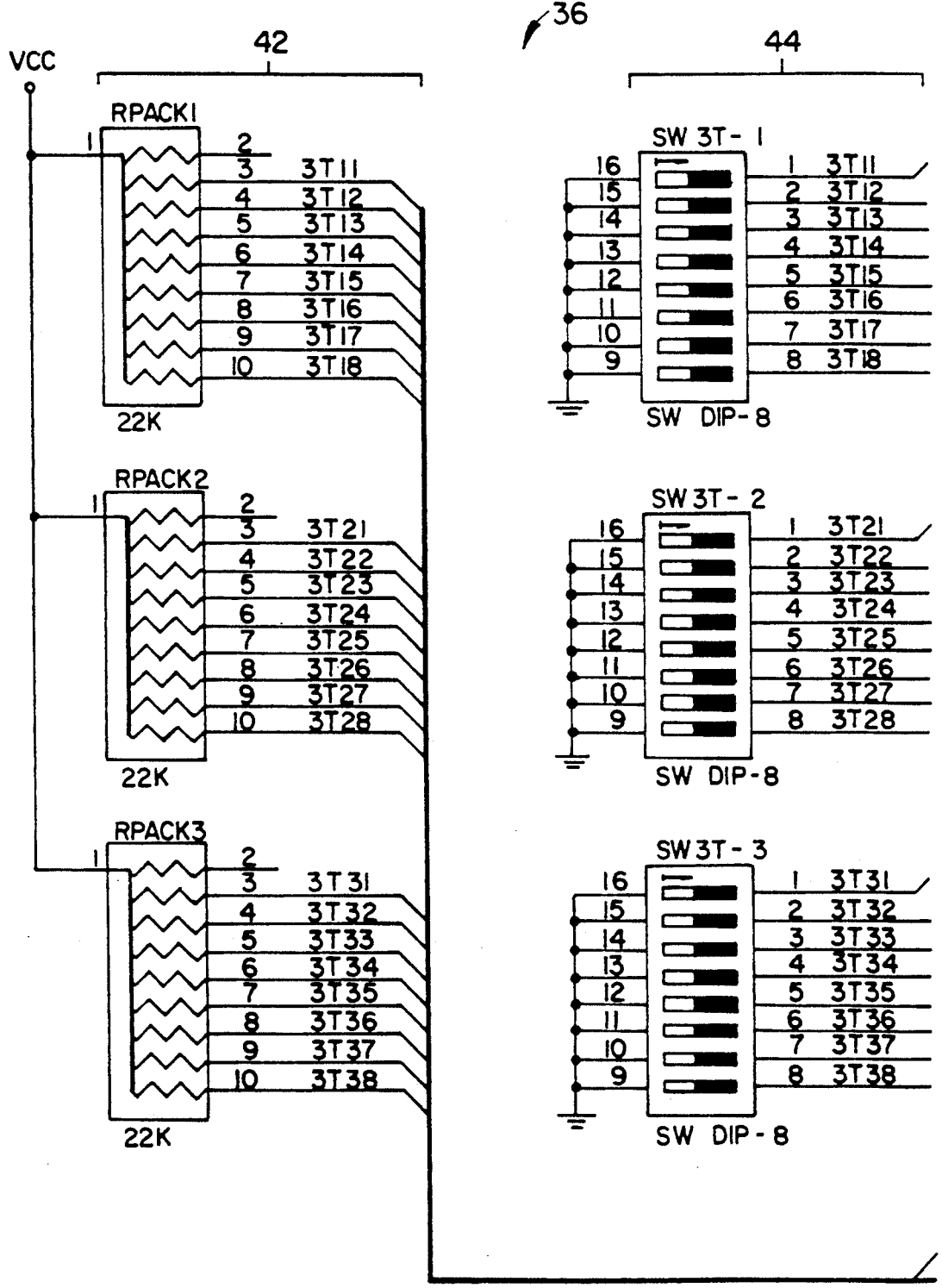
FIG._5A₁

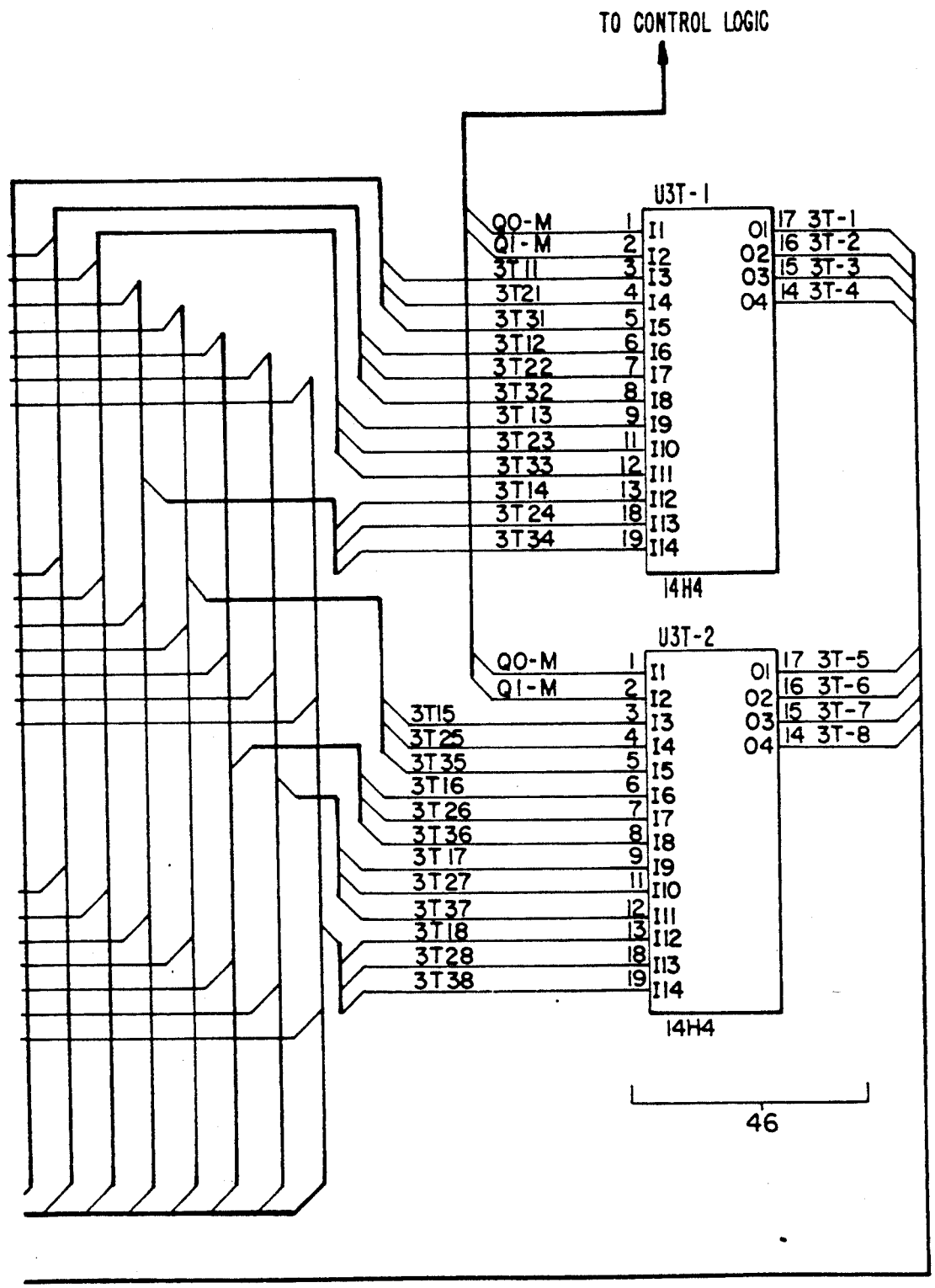
FIG._5A₂

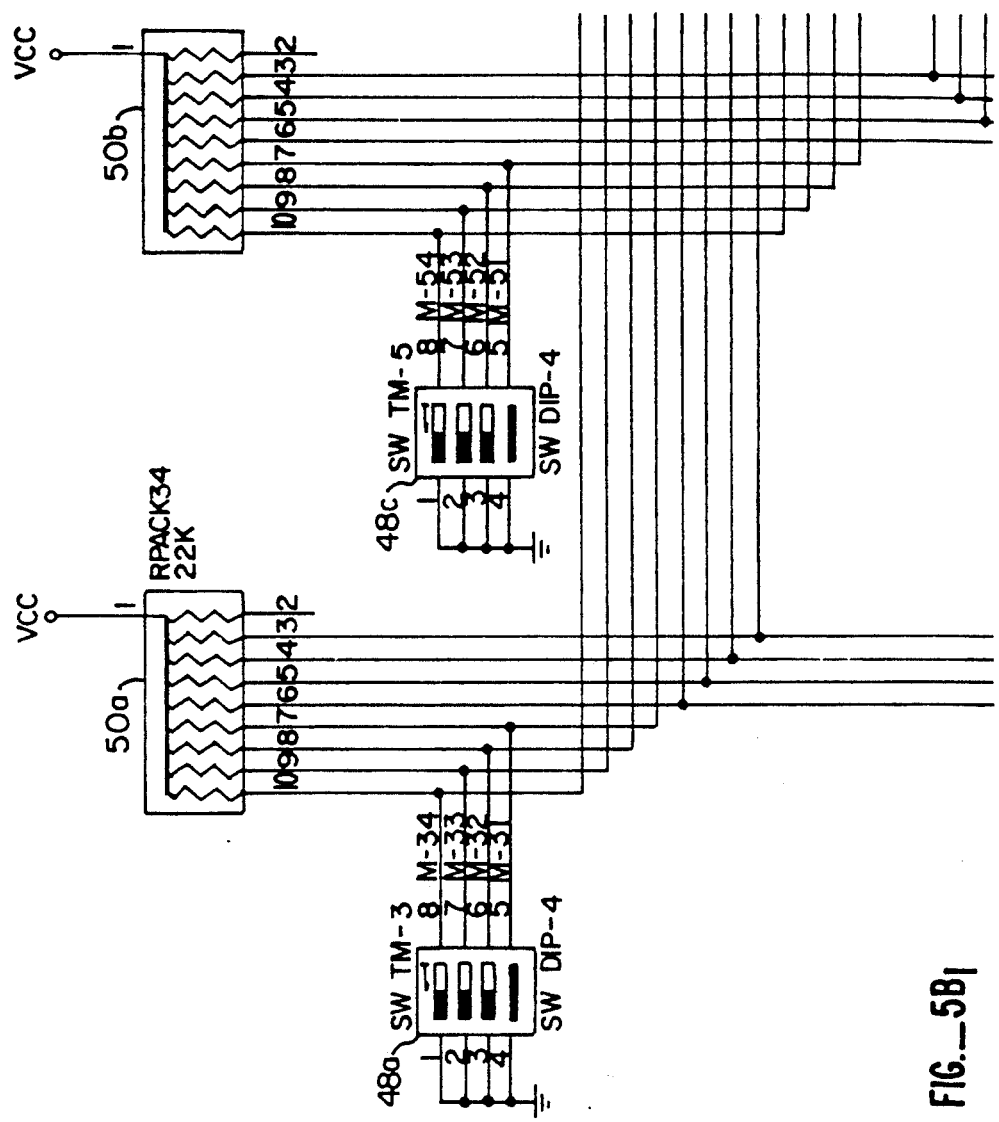

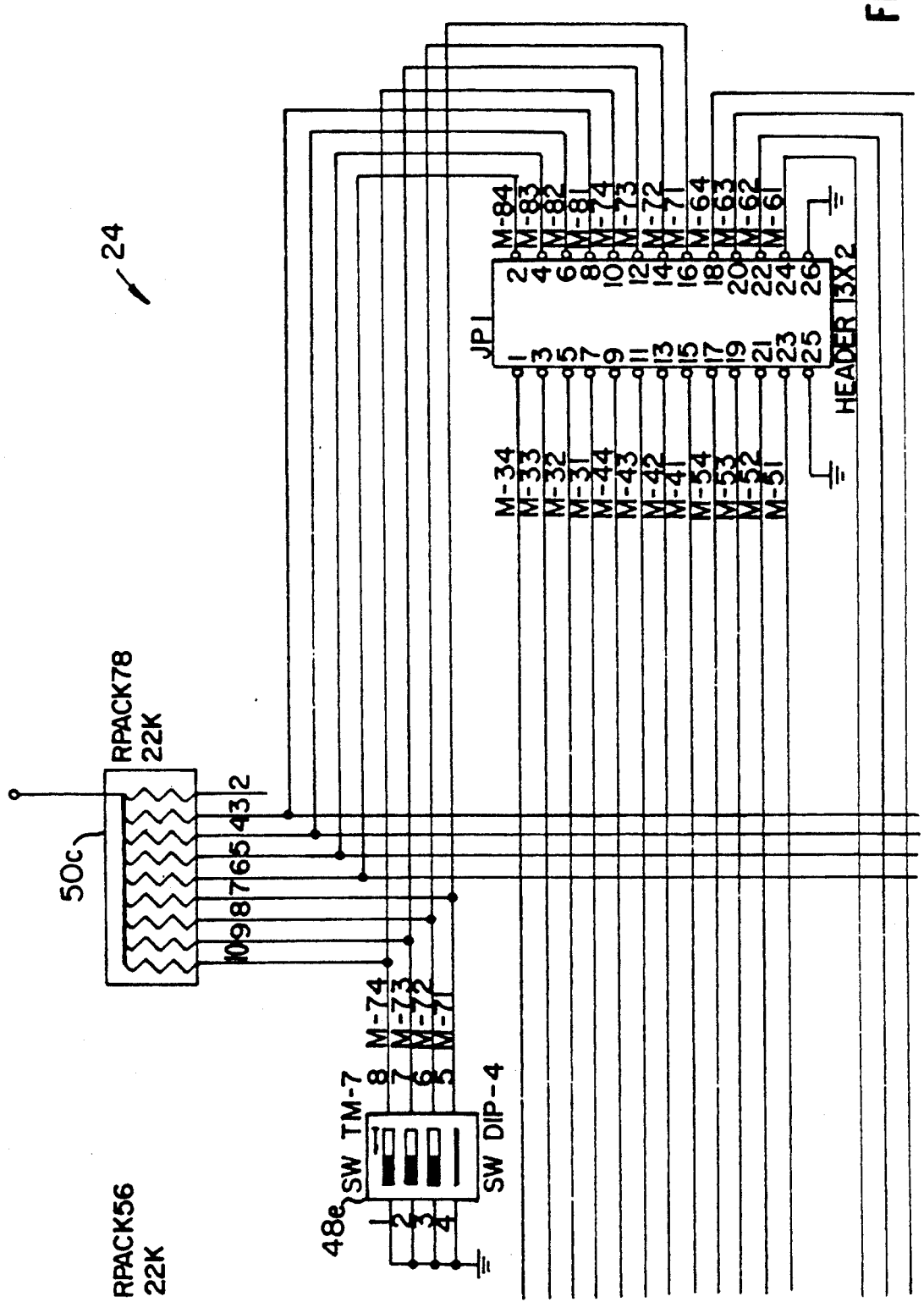
FIG._5B2

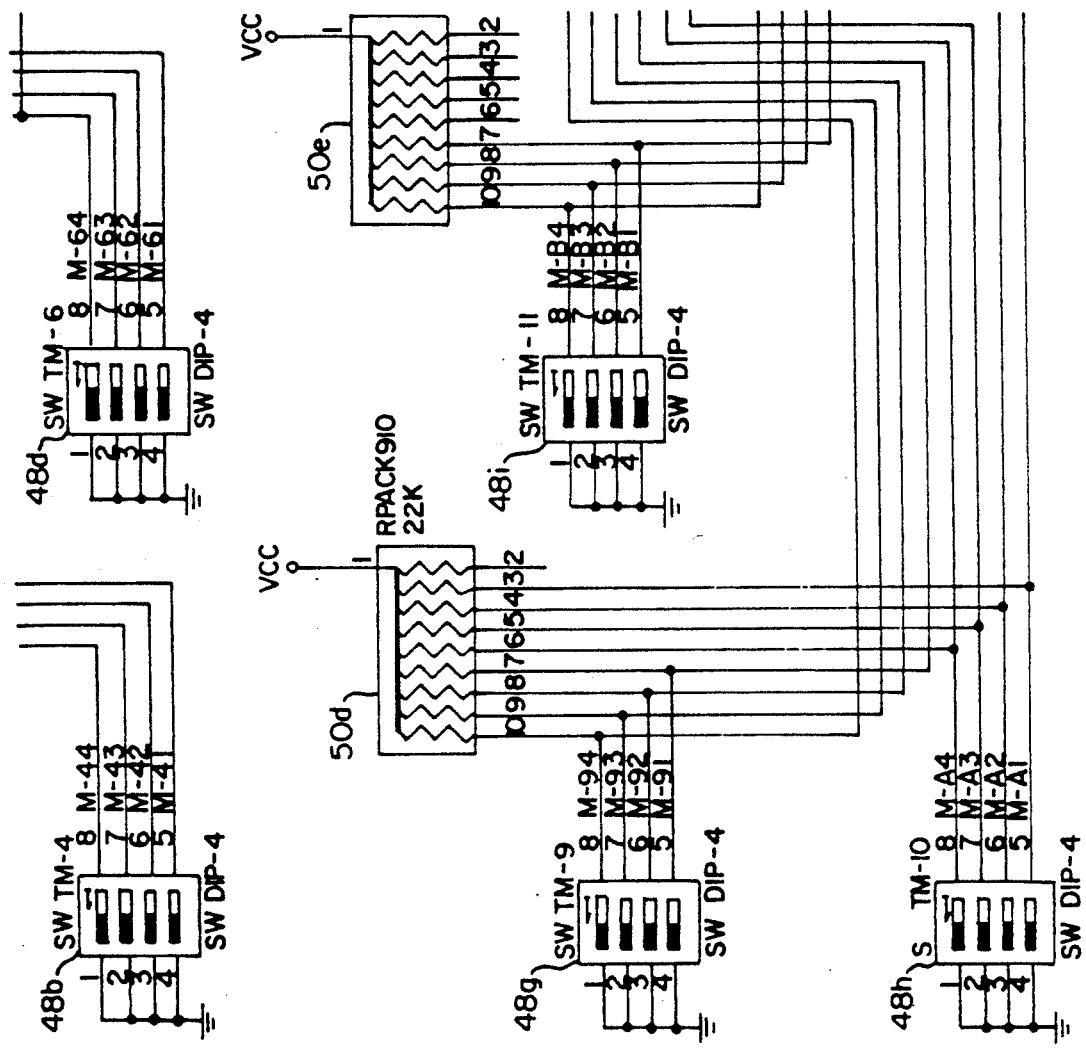
FIG._5B3

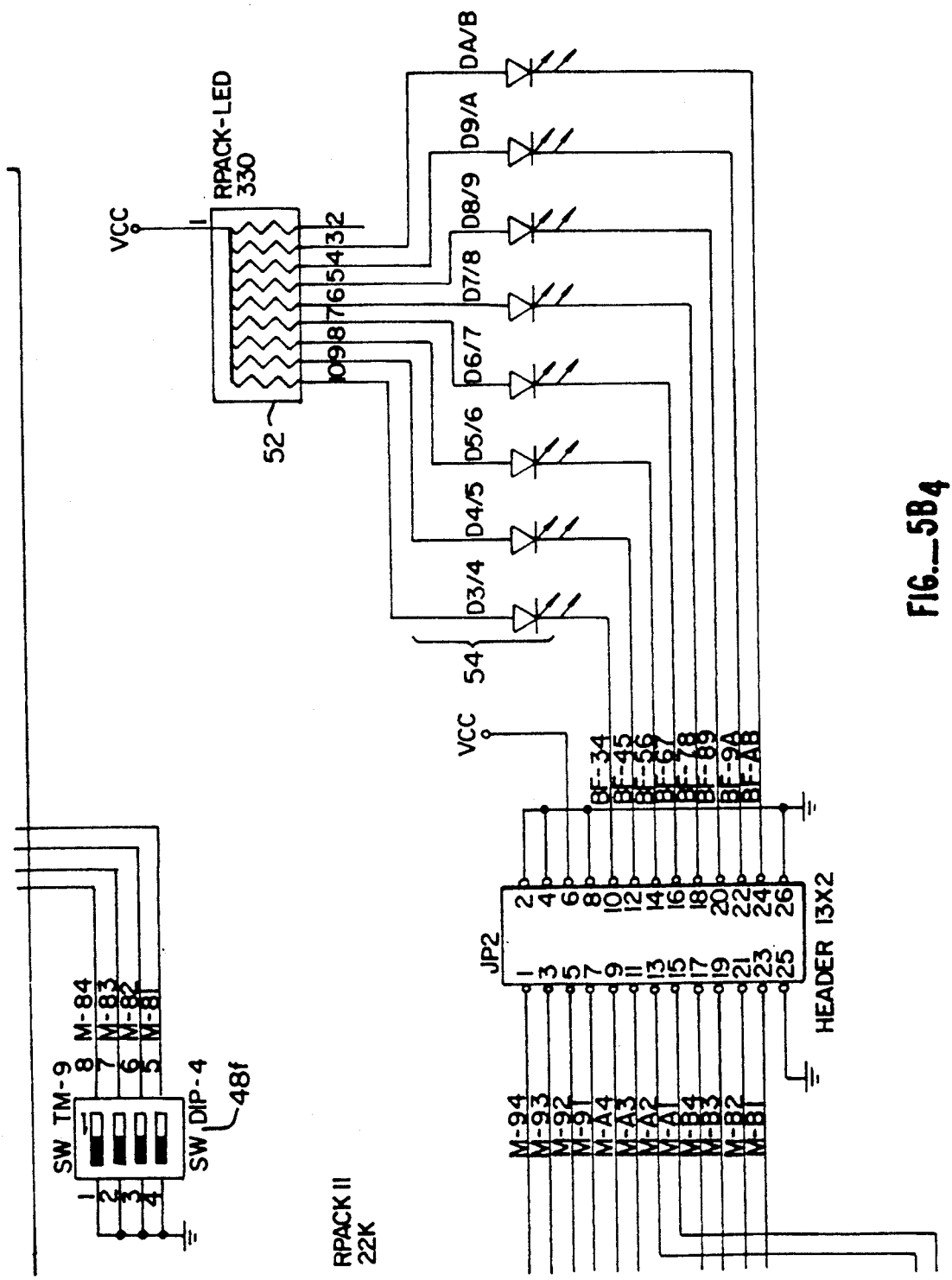
FIG._5B4

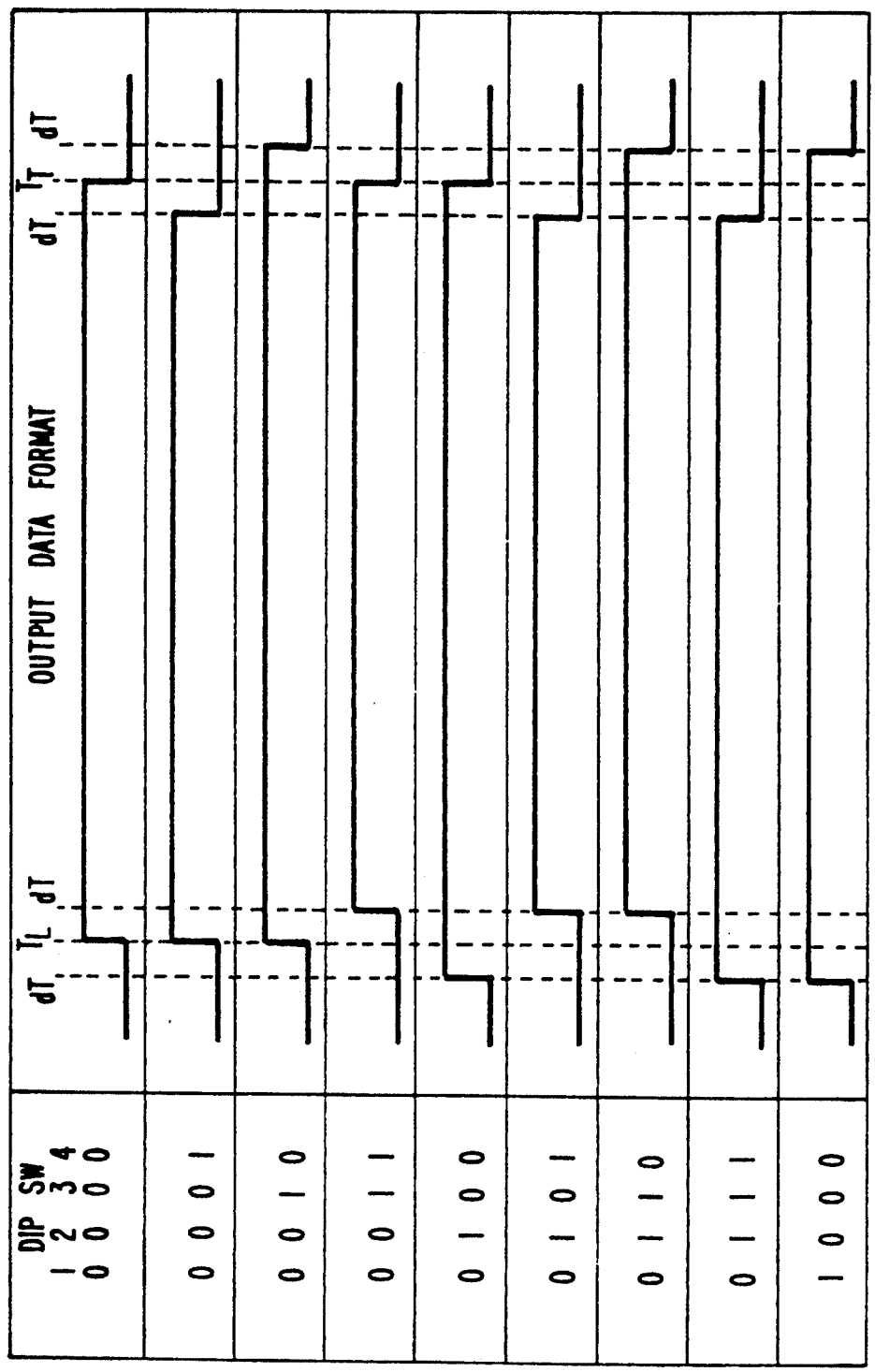
FIG._6.

METHOD AND APPARATUS FOR PRE-COMPENSATION IN AN OPTICAL DISC

BACKGROUND OF THE INVENTION

The present invention relates to the field of optical disc recording and playback apparatus. More specifically, in one embodiment the invention provides a method and apparatus for improving the quality of recorded data on an optical disc and, more particularly, a method and apparatus for varying the amplitude and timing of an input write signal prior to its being applied to a write beam modulator in an optical recording system.

Optical discs and methods for recording and erasing data on optical discs are well known. For example, Feyrer et al., U.S. Pat. No. 4,719,615, discloses an optical recording media and method of recording thereon and is incorporated herein by reference for all purposes. In Feyrer et al., a laser recording beam is directed at a recording media which includes a material which expands upon heating. When the recording beam is directed at the material, the expansion material is retained in an expanded state, creating a data bump or mark.

An improved recording media and method for recording thereon is disclosed in U.S. application Ser. No. 294,723, assigned to the assignee of the present invention and incorporated herein by reference for all purposes. Copending application Ser. No. 294,723 discloses, among other things, a method and apparatus for recording and erasing optical discs which requires only a single wavelength laser beam for erasing, writing, and reading from the media.

In some prior optical recording systems the write beam is controlled by a modulating signal which includes a series of pulses which are 0 or 3 volts. In most compact disc applications, the pulses range in time from 3T to 11T where "T" is a clock period used in the recording device (typically 231 nanoseconds).

In standard compact disc recorders and players, 8,14 code (otherwise referred to as eight-to-fourteen or EFM) is utilized. Eight-bit binary numbers in EFM are represented by 14-bit channel codes. Only 258 distinct codes of 16K possible combinations are used to ensure that the run length is not less than 3T or greater than 11T, to allow for packing bits, and the like. Decoding is typically performed with a lookup table. Channel coding for optical discs and other recording media is described in Watkinson, *The Art of Digital Audio*. Focal Press, Chapters 6 and 8 (1988), which is incorporated herein by reference for all purposes.

A method/apparatus for recording digital signals is also disclosed in Tanaka et al., U.S. Pat. No. 4,425,637. The leading edge of a digital binary signal used to write on an optical disc is advanced to decrease the effective spot size of a recorded mark. To increase effective spot size, the digital read signal time period is increased by delaying trailing edges of the digital signal. All recorded marks provided by Tanaka et al. are delayed or advanced. No method or apparatus for modulating record beam amplitude, or for accounting for differences in record signal length is shown or suggested.

While prior art recording systems for optical discs have met with some success, certain problems are created, particularly when the marks recorded on the disc reach a very small size. When very small mark sizes are used there is frequently insufficient correspondence between a write beam modulating signal and the recorded bumps or marks. For example it has been observed by the inventors herein that with prior art recording systems a mark formed by application of a laser beam for a time period of 3T may actually be substantially longer than 3T on the disc. Also, the leading and trailing edges of such marks are often ill-defined. Further, the center of a mark may not be flat, but may have higher and lower points therein. The recording beam spot size and the characteristic media response dimensions, therefore, have become limiting factors in such recording systems. Further, even when recorded marks are "perfect" an electrical playback signal produced from the marks may be flawed, i.e., the signal length produced during playback of the mark may not correspond well with the intended mark length due to the finite size of a playback light beam.

Accordingly, it is seen that an improved method and apparatus for modulating a write beam in an optical data recording system is desired.

SUMMARY OF THE INVENTION

An improved method and apparatus for modulating a write beam signal in an optical data recording system is disclosed. In a preferred embodiment, the amplitude of a write signal used in a write beam modulator is varied over the time during which the beam is applied. In another preferred embodiment the time over which the write beam is applied is varied from a desired playback time such that actual playback time corresponds well with desired playback time. In most preferred embodiments the amplitude and timing of the write signal are varied in combination. The variations are designed to provide optimal playback response from an optical disc or the like.

In some embodiments the variations are user programmed to account for, for example, a specific media type or for particular recording conditions. This is accomplished through the use of an array of switches or a computer program which is used to enter values in a memory register. The memory register may be, for example, an EPROM.

In alternative embodiments the variations are controlled through the use of a ROM containing a specific pre-compensation characteristic. The ROM may in some embodiments be a plug-in device such that the user may choose among a variety of pre-compensation characteristics.

Accordingly, in one embodiment the invention comprises signal generation means, the signal generation means providing first signals representative of signals of a first and a second state for first time periods, the first time periods substantially equal to desired times for playback of marks on a storage media; and means for adjusting the signals to provide output signals of second time periods, the output signals driving a write beam for formation of optically-detectable marks on the storage media, the optically-detectable marks providing a response to a read beam of substantially the desired playback times.

In an alternative embodiment the invention includes signal generation means, the signal generation means providing first signals of first and second states for first time periods; and means for adjusting the first signals to provide output signals of at least first, second, and third states, the output signals driving a write beam for formation of optically-detectable marks on a storage media, the optically-detectable marks providing a response to a read beam of substantially desired playback times.

A further understanding of the nature and advantages of the inventions herein may be realized by reference to the remaining portions of the specification and the attached drawings.

BRIEF DESCRIPTION OF THE DRAWINGS

FIG. 1 is a schematic diagram illustrating operation of the invention;

FIG. 2 is an overall block diagram of the circuit used in operation of the invention;

FIG. 3 is a detailed block diagram of one embodiment of the invention;

FIG. 4 is a frequency response curve of the low pass filter used in one embodiment of the invention;

FIGS. 5a and 5b, illustrate switch arrays used for amplitude and time modulation, respectively; and FIG. 6 illustrates the output for various switch settings.

DESCRIPTION OF THE PREFERRED EMBODIMENTS

CONTENTS

I. General

II. Detailed Description

I. General

The invention herein provides for variation of the amplitude of a laser modulating signal over the time during which a laser write beam is applied to an optical disc. In some embodiments the amplitude of the signal used to modulate the write beam in an optical recording system is varied between about 0 and 5 volts. The variation between 0 and 5 volts may conveniently be up to 256 steps corresponding to an 8-bit code.

In alternative embodiments the timing of the laser modulating signal is varied from the time over which it is desired to produce a playback signal. In some embodiments, using EFM code, the position of leading and/or trailing edges of the laser modulating signal are adjusted over a range of, for example, up to two steps of 0.25T (about ±58 nanoseconds) for a total adjustment of up to 116 nanoseconds from the nominal pulse transition time. In most preferred embodiments the amplitude and timing of the laser modulating signal are adjusted in combination.

The invention will find application in a wide variety of optical disc applications. In preferred embodiments, the optical recording media is selected from those described in copending U.S. application Ser. No. 294,723, which is incorporated herein by reference for all purposes. The invention is not so limited, however. For example, the invention will also find application in write-once/read-many (WORM) type media such as ablative media and in dye polymer media, magneto-optic media, phase-change media, and the like.

The invention is illustrated herein primarily with regard to the use of EFM code, which is currently the CD standard. However, it is clear that the invention will find application with a wide variety of coding systems such as ⅔, 4/5, 2/7, 4/6M, 8/10, convolutional RLL codes, randomized NRZ codes, and the like.

FIG. 1 is an overall illustration of the operation of the invention as it is applied to a single input pulse used to modulate a write laser in an optical recording system. An input pulse, which is of the type commonly used in prior art systems to drive a write beam laser, is input to the modulation system 2. As shown in the left hand portion of FIG. 1 the input pulse has an amplitude of about 3 volts. The pulse used for illustration in FIG. 1 has a period of 3T, corresponding to about 693 nanoseconds. It will of course be understood that pulses in the commonly used EFM code in compact discs will range from 3T to 11T.

It has been observed that shorter pulses in many types of optical recording media ultimately produce longer than desired playback response on the media. This may be due to, for example, dissipation of heat in the recording media. Accordingly, the amplitude and time modulation system 2 adjusts the period of the applied beam to be less than the time desired in playback of the mark. In this case the pulse is shortened to about 2.75T which is about 58 nanoseconds less than the input signal.

It has also been observed by the inventors herein that marks recorded on typical optical recording media tend to produce a playback signal that ramps gradually downwards rather than providing a sharp drop and constant level thereafter. This may be due, for example, to loss of heat in the media during its initial heating by the write beam. Accordingly, the invention herein provides for a greater amount of power during the early portion of the pulse cycle, with a gradual falloff in power during the middle of the pulse. A similar lack of mark definition has been observed by the inventors herein at the end of marks on typical optical recording media and, accordingly, greater power is applied to the write beam at the end of the pulse cycle.

The graph on the right-hand side of FIG. 1 illustrates the resulting pulse. The pulse length is shortened to about 2.75T. The leading and trailing edge voltage are increased above the nominal 3 volts, while the voltage during the middle of the pulse is decreased below 3 volts.

II. Detailed Description

FIG. 2 is an overall block diagram illustrating an amplitude and/or time modulation system 2. The "data in" signal is an uncompensated write signal in EFM 3T to 11T form. The "data out" signal drives a write beam modulator 4.

A data length detector 6 initially determines if an incoming pulse is a 3T, 4T, 5T, . . . , or 11T in length. Based upon the length of the incoming pulse, the amplitude and the time duration of the pulse are adjusted according to a set of predetermined or user supplied instructions. These instructions are, in some embodiments, encoded in a set of 8-bit words which are programmed with manual switches or read from information previously entered into storage records 8. In some embodiments the storage records 8 are contained in an EPROM, ROM, or a plug-in ROM. In alternative embodiments, a plurality of instruction sets are stored in the device for a number of storage media types, and the proper instruction set is selected based upon the type of media. The type of media may be encoded in, for example, initial information read from the optical disc. In still further embodiments, the information is developed internally by recording and playing back sample marks during start-up of the system, and storing adjusted amplitude and format data based on the test marks.

Based upon the length of the incoming pulse and the stored information, the length of an encoded version of the incoming pulse is adjusted in timing adjustment circuitry 10 and amplitude adjustment circuitry 12. A compensated, encoded series of signals is then passed to a D-to-A converter and low pass filter 14. An analog signal is then provided to laser modulator 4 for modulation of the write beam in a recorder.

In some embodiments pulse start and stop times are modulated with a time resolution of about T, or 231 nanoseconds, although fractions of T, e.g., increments of from 0.1T to about T, with increments of about 0.25T preferred, may be used in some embodiments.

The nominal or quiescent power from the laser between pulses is preferably adjusted to be between 0.5 to 1 milliwatts to support tracking and servo functions in the recorder. The pulse power used for recording a data mark will of course vary from recording media to recording media, but in preferred embodiments is adjustable to between about ±25% of nominal pulse power $P_o$. $P_o$ in preferred embodiments, using media described in copending U.S. application Ser. No. 294,723 for example, is between about 8 and 20 milliwatts and $P_o$ is preferably adjustable by way of the invention herein. Power setting resolution is preferably about ±3% of $P_o$.

In preferred embodiments, power is modulated during the period of a pulse and is easily and individually selectable by the user for each of the 3T to 11T pulses without distrubing the modulation function of pulses of other lengths. In most preferred embodiments, power is adjustable to a variety of values during a pulse.

The modification of pulse turn-on time is in some embodiments dependent upon the length of the pulse being written, the length of the preceding pulse, and/or the lengths of the one to two preceding quiescent times between pulses. Of course, the pulse turn-on time is limited in most embodiments to lie within limits, which may be for example, 1T of the original pulse turn-on time. The exact relation between the above factors and turn-on time will be dependent upon the media and recording apparatus in use.

Similarly, the power of the pulses, particularly the 3T and 4T pulses, is also adjusted based on pre- and post-proximity factors such as those listed above. Adjustment of the parameters used in writing on a particular media may be determined by examination of a playback signal from a known write sequence.

Qualitative rules effective in certain recording media include the following:

A. Increase the power and decrease the duration of the short pulses (3T, 4T, and, in some cases, 5T). The power increment for short pulses should be between about 2 and 100% of $P_o$ depending upon the media, e.g., about 25%. The decrease in duration should be between about 0.1 to 1T and preferably about 0.25T.

B. Increase the duration of the long pulses (8T to 11T) by between about 0.1 and 1T, preferably about 0.5T, and modulate long pulse amplitude to give symmetry to the playback signals by shifting between about 1 and 100%, preferably about 25%, of the energy from the second and third eights of the pulse to the last half of the pulse.

C. For all pulses except the 3T pulse, quiescent periods (non-on periods) next to a pulse being written may require additional pulse modification. For example, for a short (less than about 5T) quiescent period preceding the pulse, the pulse transition is moved toward the pulse center by 1T (about 50 nanoseconds). If the quiescent period preceding the pulse is greater than about 5T, the pulse transition is not moved.

Table 1 illustrates a form of a look-up table which may be used to store the required data according to one embodiment of the invention. In each case $T_1$ is the number of time increments which the pulse start is advanced or moved back from its nominal start time for the given pulse length. $T_t$ indicates the number of time increments which the pulse trail is advanced or moved back from its nominal time for the given pulse length. Each $P_i$ indicates the number of units of power which the beam is increased or decreased above a nominal power during that portion of the pulse. In some embodiments the nominal power is about 8 to 20 milliwatts and a unit of power increase is about 3% of the nominal power input.

TABLE 1

| Pulse Length | $T_1$ | $T_t$ | $P_1$ | $P_2$ | $P_3$ | $P_4$ | $P_5$ | $P_6$ | $P_7$ | $P_8$ | $P_9$ | $P_{10}$ | $P_{11}$ |
|---|---|---|---|---|---|---|---|---|---|---|---|---|---|
| 3T | — | — | — | — | — | | | | | | | | |
| 4T | — | — | — | — | — | — | | | | | | | |
| 5T | — | — | — | — | — | — | — | | | | | | |
| 6T | — | — | — | — | — | — | — | — | | | | | |
| 7T | — | — | — | — | — | — | — | — | — | | | | |
| 8T | — | — | — | — | — | — | — | — | — | — | | | |
| 9T | — | — | — | — | — | — | — | — | — | — | — | | |
| 10T | — | — | — | — | — | — | — | — | — | — | — | — | |
| 11T | — | — | — | — | — | — | — | — | — | — | — | — | — |

In preferred embodiments, $T_1$'s will be selected from the group:

$T_{10}$ $T_{10} + dT$ $T_{10} - dT$ $T_{10} + 2(dT)$ $T_{10} - 2(dT)$ where:

$T_{10}$ is the nominal or input start time, and dT is a differential unit of time, which in some embodiments is 0.25T or about 50 nanoseconds.

It will be recognized that the values inserted in the above table will be highly media-specific and will best be determined through characterization of the media of interest.

In some embodiments the $T_1$'s are fixed values as shown in Table 1. However, in preferred embodiments, the $T_1$'s are adjusted according to the time between the end of the previous pulse and the beginning of the current pulse ($T_p$) (in addition to the length of the present pulse). In most preferred embodiments, the $T_1$'s are selected according to a look-up table of the form illustrated in FIG. 2. In Table 2, the entries will generally be in units of dT by which the pulse start is advanced or delayed, where dT is, for example 0.25T.

TABLE 2

| Units of T Since Last Pulse | Length of Next Pulse | | | | | | | | |
|---|---|---|---|---|---|---|---|---|---|
| | 3T | 4T | 5T | 6T | 7T | 8T | 9T | 10T | 11T |
| 3 | — | — | — | — | — | — | — | — | — |
| 4 | — | — | — | — | — | — | — | — | — |
| 5 | — | — | — | — | — | — | — | — | — |
| 6 | — | — | — | — | — | — | — | — | — |
| 7 | — | — | — | — | — | — | — | — | — |
| 8 | — | — | — | — | — | — | — | — | — |
| 9 | — | — | — | — | — | — | — | — | — |
| 10 | — | — | — | — | — | — | — | — | — |
| 11 | — | — | — | — | — | — | — | — | — |

In some embodiments the $T_l$'s are fixed values as shown in Table 1. However, in preferred embodiments the $T_l$'s are dependent on the time between the end of the current pulse and the beginning of the next pulse ($T_n$), as well as the duration of the next pulse. A look-up table of the form shown in Table 3 may be used in some embodiments. The entries in Table 3 will be the number of units of dT by which the trailing edge of the pulse is advanced or delayed.

TABLE 3

| Units of T Before Last Pulse | Length of Next Pulse | | | | | | | | |
|---|---|---|---|---|---|---|---|---|---|
| | 3T | 4T | 5T | 6T | 7T | 8T | 9T | 10T | 11T |
| 3 | — | — | — | — | — | — | — | — | — |
| 4 | — | — | — | — | — | — | — | — | — |
| 5 | — | — | — | — | — | — | — | — | — |
| 6 | — | — | — | — | — | — | — | — | — |
| 7 | — | — | — | — | — | — | — | — | — |
| 8 | — | — | — | — | — | — | — | — | — |
| 9 | — | — | — | — | — | — | — | — | — |
| 10 | — | — | — | — | — | — | — | — | — |
| 11 | — | — | — | — | — | — | — | — | — |

In some embodiments it is also desirable to further modify the power level shifting so as to be dependent upon $T_p$ and/or $T_n$, where $T_p$ is the quiescent time period preceding the present pulse and $T_n$ is the quiescent time period between the present pulse and the next pulse. In most preferred embodiments, if the present pulse is less than or equal to 5T in length and $T_p + T_n < 10T$, the power level of part or all present pulse is modified by the amount of an additional $\pm 1$, 2, or 3 times dp, where dp is between about 1 and 90% of $P_o$ and, in some embodiments, about 25% of $P_o$. In some embodiments the power levels for 3, 4, and 5T pulses are modified according to a table of the form shown in Table 4 when $T_p + T_n < 10T$.

TABLE 4

| Pulse Length | Pulse Power Adjustment (milliwatts) when $T_p + T_n < 10$ |
|---|---|
| 3T | — |
| 4T | — |
| 5T | — |

When the length of the pulse is adjusted based on pre- and post-proximity factors, it is preferred that amplitude adjustment follows pulse timing adjustment.

FIG. 3 illustrates in greater detail one embodiment of a circuit which may be used in implementing the invention. The signal "data in" is a conventional 3T to 11T EFM signal. The signal enters serial-in/parallel-out shift register(s) 16 which may be, for example, 74HC164 shift registers. Signals from the shift register(s) 16 are input to logic device 18 which may be, for example, a PAL such as a 22V10. Depending upon the length of the incoming signal, logic device 18 provides an output to one of an array of latches 20 which may be, for example, an array of 74HC74's, to hold the appropriate output of logic device 18 during a pulse period. Preferably, an array of nine latches is provided. Output from each latch will be representative of a different pulse time ranging from 3T to 11T.

Latch array 20 is connected to second logic device(s) 22 which may be, for example, 22V10's. Depending upon which of the latch array 20 is positive, and depending upon input of leading and trailing edge data switches 24, logic device(s) 22 advance and/or delay, in digital form, the leading and/or trailing edges of a pulse by a selected amount.

Since adjustment of the leading and trailing edges of the pulse may result in a pulse which is of a length different from the input pulse, it is again necessary to input the pulse to shift registers 26, logic 28, and latch array 30 for pulse length detection. It is necessary to operate these components on a 4X clock period so as to provide independent pulse time adjustment. Therefore, a clock period adjustment means 32 is provided.

The pulse width is input to a logic device 34 for selection of pulse amplitude during each clock period, based upon input from pulse amplitude data storage 36, to a d-to-a converter 38 which may be, for example, a TDC1016. The output of the d-to-a converter 38 is input to a low-pass filter 40. FIG. 4 provides a frequency response curve of a representative low-pass filter which has been found to be useful herein.

The output from the low-pass filter 40 is, thereafter, passed to an appropriate amplifier/buffer 42 for driving of a write beam laser or laser diode 44 of the type known to those of skill in the art.

FIG. 5a illustrates a switch array which may be used to provide pulse amplitude data 36 for a 3T pulse. It will be recognized that a similar array will be provided for 4T, 5T, . . . and 11T pulses.

The switch array includes a plurality of resistor packs 42 connected with DIP switches 44 to ground. The number of switches 42 and resistor packs 42 will vary from application to application, but in the embodiment shown in FIG. 5a independent control of the amplitude of 3 subintervals, each of time T, of a 3T pulse is obtained. Although not shown, a similar arrangement is provided for 4T pulses which includes 4 DIP switches and resistor packs up to 11 DIP switches and resistor packs for an 11T pulse.

Pins I3 to I14 of PAL's 46 (which act as multiplexors) are tapped from the lines running between the switches and resistor packs and will provide a $V_{cc}$ voltage when the connected switch is open and a voltage of 0 when the switch is closed. Based on clock input to pins I1 and I2 of PAL's 46, PAL's 46 select "data" for either the 1st, 2nd, or 3rd time period of a 3T pulse, which is output to another PAL (not shown) which selects among the 3T, 4T . . . 11T data.

FIG. 5b illustrates a switch array which may be used to provide leading/trailing edge data 24. DIP switches 48a, b, c . . . 48h are connected to resistor packs 50a, b, c, d and e, so as to provide outputs to control the leading edge and trailing edge of a pulse. The particular configuration shown in FIG. 5b provides essentially a 4 digit binary output representative desired leading edge and trailing edge adjustments for each of the 3T to 11T pulses. FIG. 6 illustrates possible combinations of dip-switch settings versus the output data format. For example, a switch setting of 0101 delays the leading edge of the pulse by dT, while advancing the trailing edge by dT.

Referring again to FIG. 5b, it is seen that a resistor pack 52 and set of LED's 54 are also provided and serve to indicate adjustment combinations which may not be workable. For example, if the leading edge of a 3T pulse is advanced by dT (T/4) and the trailing edge of the 3T pulse is delayed by T/4 (i.e., a switch setting of 1000 for the 3T pulse) while at the same time the leading edge of the 4T pulse is delayed by dT and the trailing edge is advanced by T/4(a switch setting of 0101 for the 4T pulse) an LED is illuminated (indicated by D3/4). This LED alerts the user that there may be an ambiguity regarding the 3T and 4T pulse since they are now of the same total length.

It is to be understood that the above description is intended to be illustrative and not restrictive. Many variations of the invention will become apparent to those of skill in the art upon review of this disclosure. Merely by way of example the invention has been illustrated primarily with regard to EFM modulation since this is presently the CD standard, but the invention is not so limited. The invention has been primarily illustrated with regard to variation of pulse power intensity, but the invention will also find application in quiescent power modulation. Still further, the invention with regard to the use of a set of switches to provide amplitude and time modulation information, but the invention could readily be applied to the use of computer- or microprocessor-supplied information, ROM information, and the like. Still further, while the invention has been illustrated with regard to input pulses of 3T, 4T . . . length, the invention will also find application when the input is, for example, a binary number representative of a 3T, 4T . . . pulse. The scope of the invention should, therefore, be determined not with reference to the above description, but instead should be determined with reference to the appended claims along with their full scope of equivalents.

What is claimed is:

1. Apparatus for recording optically-detectable marks on a storage media comprising:
   a) signal generation means, said signal generation means providing first signals representative of signals of first and second states for first time periods, said first time periods substantially equal to desired time periods for playback of marks on the storage media; and
   b) means for adjusting said first signals to provide output signals for second time periods, said second time periods based on a duration of said first time periods, said output signals driving a write beam for formation of the optically-detectable marks on the storage media, the optically-detectable marks providing a response to a read beam of substantially said desired playback time periods.

2. Apparatus for recording optically-detectable marks on a storage media comprising:
   a) signal generation means, said signal generation means providing first signals of first and second states for first time periods; and
   b) means for adjusting said first signals to provide output signals of at least first, second, and third states, said output signals driving a write beam for formation of said optically-detectable marks on a storage media, said optically-detectable marks providing a response to a read beam of substantially desired playback times.

3. Apparatus as recited in claim 2 further comprising means for adjusting said first signals to provide said output signals with second time periods.

4. Apparatus as recited in claim 1 further comprising means for adjusting said first signals to provide output signals having at least first, second, and third states.

5. Apparatus as recited in claims 1 or 2 wherein said first signals are substantially 3-volt signals.

6. Apparatus as recited in claims 1 or 2 wherein said first time periods vary from between about (3T and 11T where T is a clock period derived from a clock signal.

7. Apparatus as recited in claim 6 wherein T is about 231 nanoseconds.

8. Apparatus as recited in claims 1 or 3 wherein at least shortest of said first signals are decreased in duration.

9. Apparatus as recited in claim 8 wherein said shortest signals are shortened by about 0.25T where T is a clock period.

10. Apparatus as recited in claims 2 or 4 wherein at least a leading edge of said output signals is increased in power above said first signals.

11. Apparatus as recited in claims 2 or 4 wherein at least a center of said output signals is decreased in power below said first signals.

12. Apparatus as recited in claims 1 or 2 wherein said first signals are in EFM format.

13. Apparatus as recited in claims 1 or 2 wherein said means for adjusting is operably connected to a ROM for supplying instructions for said means for adjusting.

14. Apparatus as recited in claims 1 or 2 wherein said means for adjusting is operably connected to a EPROM for supplying instructions for said means for adjusting.

15. Apparatus as recited in claims 1 or 3 wherein a pulse turn-on time is adjusted according to a length of a pulse to be written.

16. Apparatus as recited in claims 1 or 3 wherein a pulse turn-on time is adjusted according to a length of a preceding pulse.

17. Apparatus as recited in claims 1 or 3 wherein a pulse turn-on time is adjusted according to a quiescent time preceding a pulse to be written.

18. Apparatus as recited in claims 1 or 3 wherein at least a longest of said first signals is increased in duration.

19. Apparatus as recited in claims 2 or 4 wherein power in at least some of said first signals is shifted from a second half to a first half of the pulses.

20. Apparatus as recited in claims 2 or 4 wherein power in at least some of said first signals is shifted from a first half to a second half of the pulses.

* * * * *